United States Patent [19]

Pingel

[11] Patent Number: 5,279,631
[45] Date of Patent: Jan. 18, 1994

[54] CABIN FOR SPRAY-COATING OBJECTS WITH POWDERED COATING MATERIAL

[75] Inventor: Joachim Pingel, Hamburg, Fed. Rep. of Germany

[73] Assignee: Farb-Tec Gesellschaft fur Beschichtungskabinen Systeme mbH, Hamburg, Fed. Rep. of Germany

[21] Appl. No.: 778,098
[22] PCT Filed: Jun. 15, 1990
[86] PCT No.: PCT/EP90/00940
§ 371 Date: Dec. 13, 1991
§ 102(e) Date: Dec. 13, 1991
[87] PCT Pub. No.: WO90/15669
PCT Pub. Date: Dec. 27, 1990

[30] Foreign Application Priority Data

Jun. 16, 1989 [DE] Fed. Rep. of Germany ... 8907537[U]

[51] Int. Cl.⁵ .................. B01D 35/16; B05C 15/00
[52] U.S. Cl. .................... 55/294; 55/302; 55/DIG. 46; 118/326; 118/DIG. 7; 454/53
[58] Field of Search ............ 55/294, DIG. 7; 118/326, 118/DIG. 46, 302; 454/50-55

[56] References Cited

U.S. PATENT DOCUMENTS

| | | | |
|---|---|---|---|
| 2,516,680 | 7/1950 | Culpepper | 55/294 |
| 2,906,371 | 9/1959 | Jones | 55/294 |
| 3,166,391 | 1/1965 | Keser | 55/294 |
| 3,595,180 | 12/1970 | Schrag | 55/294 |
| 4,230,032 | 10/1980 | Perryman | 454/51 |
| 4,277,264 | 7/1981 | Buchholz et al. | 55/294 |
| 4,506,625 | 3/1985 | Vohringer | 55/302 |
| 4,770,118 | 9/1988 | Vohringer et al. | 55/DIG. 46 |

FOREIGN PATENT DOCUMENTS

| | | |
|---|---|---|
| 2262084 | 6/1974 | Fed. Rep. of Germany . |
| 2731123 | 1/1979 | Fed. Rep. of Germany . |
| 3318043 | 11/1984 | Fed. Rep. of Germany . |
| 3500005 | 7/1986 | Fed. Rep. of Germany . |
| 2009625 | 2/1970 | France . |
| 617871 | 6/1980 | Switzerland . |

Primary Examiner—Richard L. Chiesa
Attorney, Agent, or Firm—Fay, Sharpe, Beall, Fagan, Minnich & McKee

[57] ABSTRACT

A cabin for spray coating objects with powdered material has flat filter surfaces and a cleaning device that moves relative thereto. The rear face of the filter is divided into a plurality of individual cell shaped sections sealed with respect to one another. A nozzle directs air from the rear face of the filter toward the interior of the cabin to dislodge powdery material from the filter's inner surface. The nozzle moves across the field of cell shaped sections supplying compressed air to at least one of the sections at a time during the cleaning cycle.

17 Claims, 3 Drawing Sheets

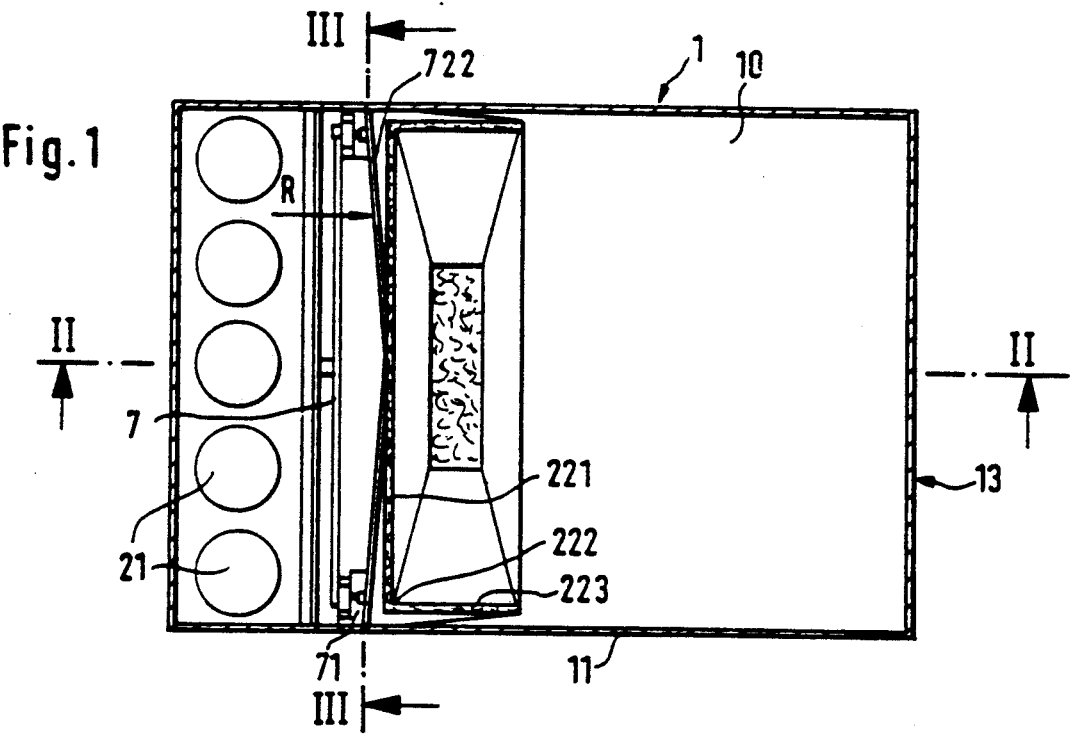
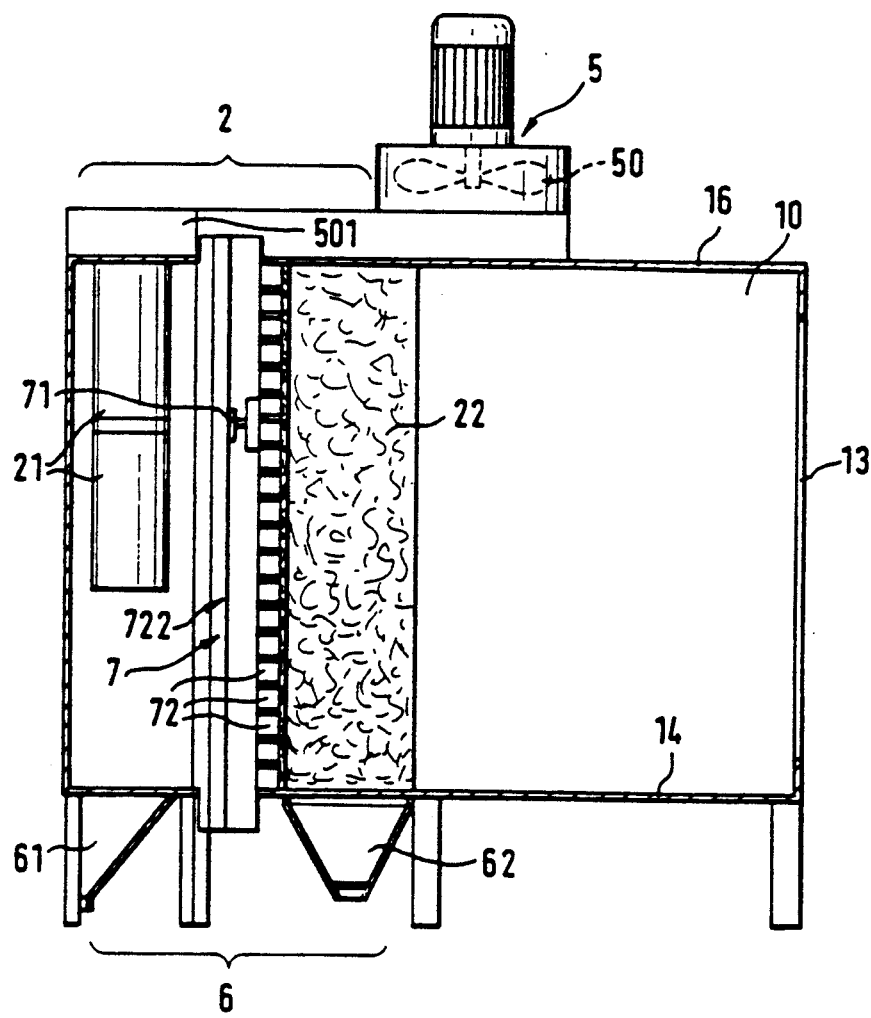

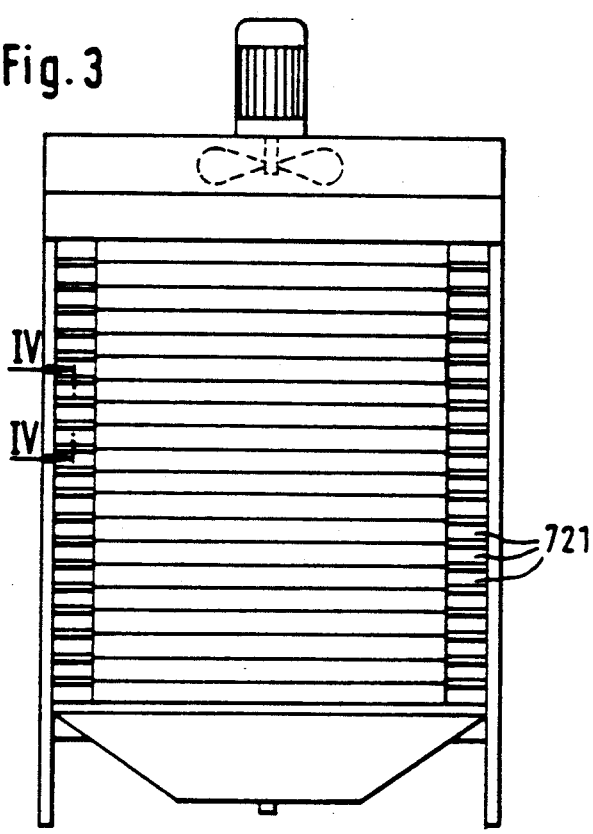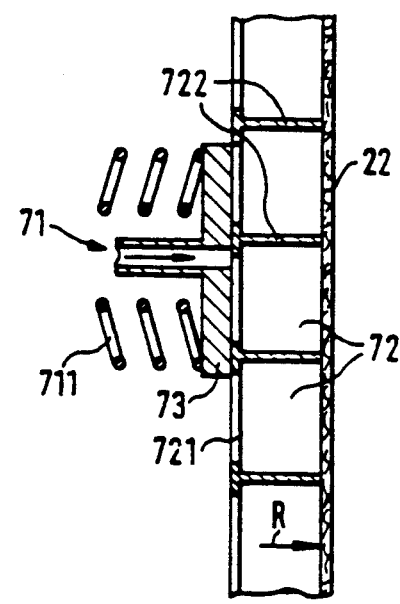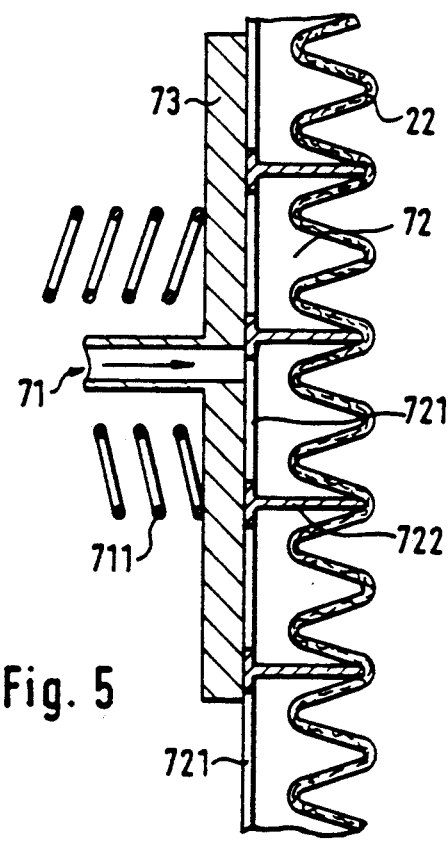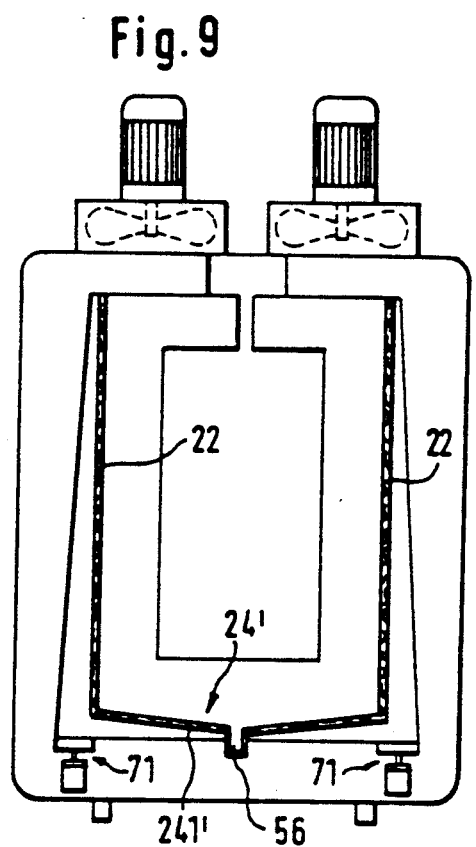

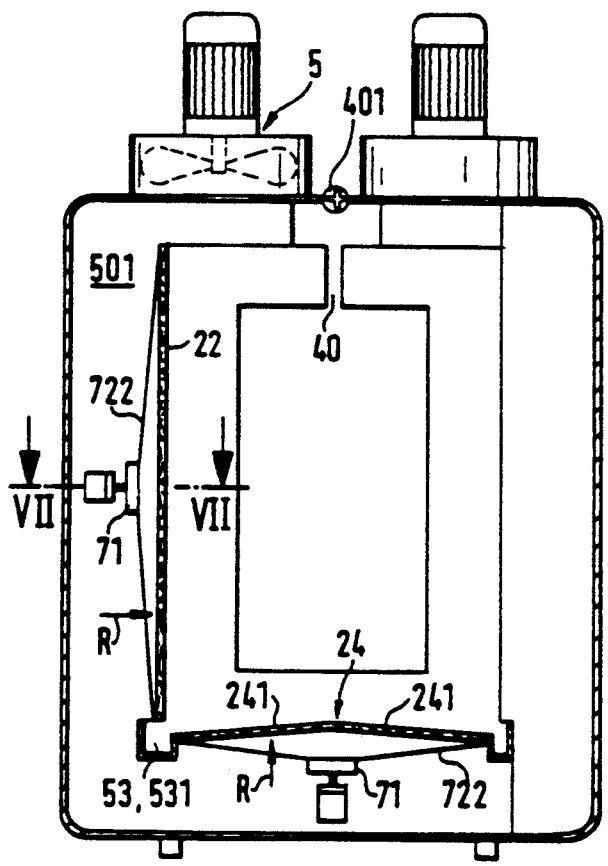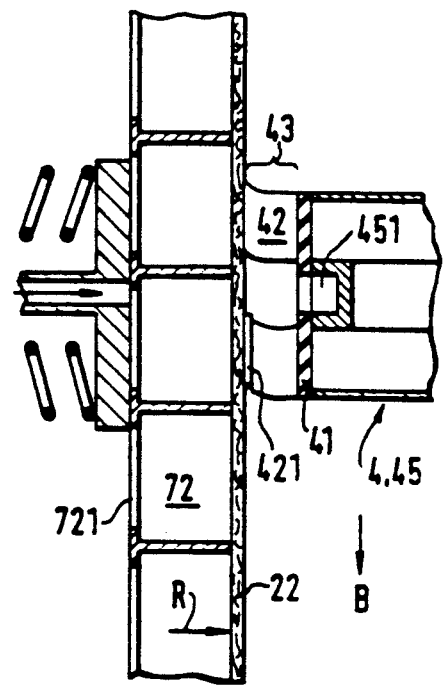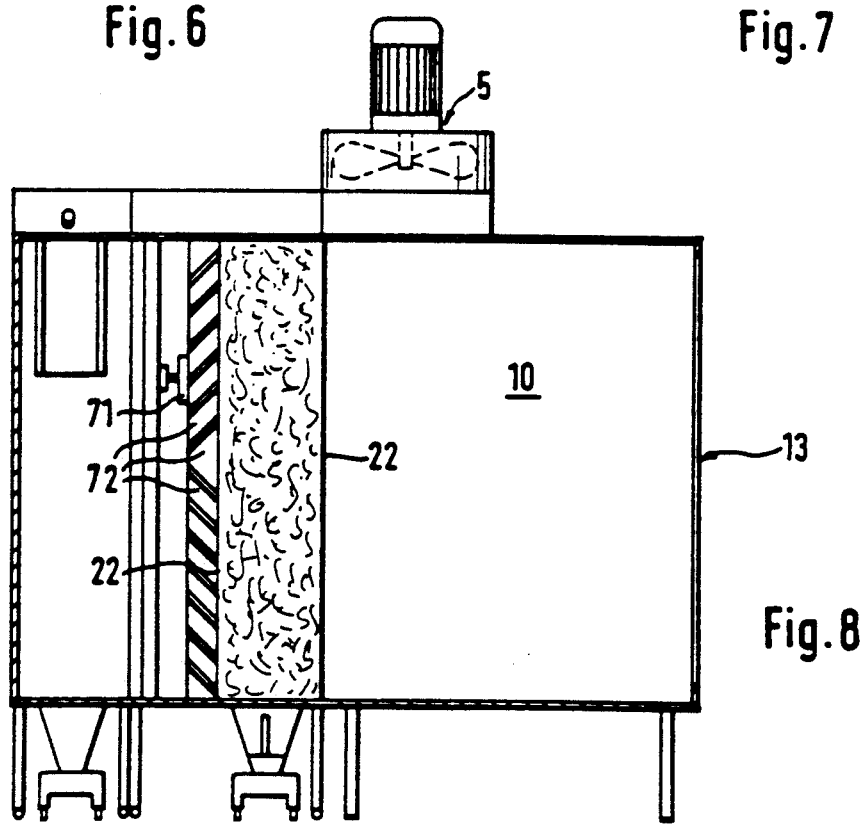

CABIN FOR SPRAY-COATING OBJECTS WITH POWDERED COATING MATERIAL

FIELD OF THE INVENTION

The invention relates to a booth for the spray-coating of articles with powdery coating material, with a filter arrangement, comprising at least one surface filter, for the powder-laden air to be conveyed filtered out of the booth into the environment, and with a cleaning device for this surface filters, a relative movement taking place between cleaning device and surface filter.

BACKGROUND OF THE INVENTION

In contrast to conventional filter-cleaning constructions which worked with mechanical means (vibration) or pressure pulses (with stationary filter and stationary nozzle), and which are unsatisfactory with regard to their degree of cleaning, and particularly in which the mechanical stress on sensitive filters, above all, is too high, filter arrangements of the above type have been developed, in which either the cleaning device, normally in the form of nozzle, is moved and the filter is stationary (U.S. Pat. No. 4,770,118) or a movement of the filter occurs, with the nozzle being stationary. The main purpose of conventional filter-cleaning devices is to clean the filter during operation in such a way that it remains operational, that is to say to regenerate it. In the event of a color change, especially when there are pronounced differences in the color shades, the filters have to be exchanged completely.

Where the nozzles are concerned, there are generally two systems, namely one in which compressed air is blown through the filter from the clean-air side, that is to say from the rear side of the filter remote from the booth interior (German Offenlegungsschrift 3,318,043), and another in which the work is carried out with suction air from the booth interior, that is to say from the "dust" side (German Patent Specification 3,023,044).

Surface filters have the advantage over cartridge filters, which allow a higher degree of separation per se as a result of their larger filter area in relation to the constructional size, in that they can be produced relatively cheaply and permit a very rapid filter exchange in the event of a color change (for example, cling fastenings in needle-felt filters), thereby affording advantages especially when medium or relatively small batch sizes of parts are to be coated. For reasons of effectiveness and, above all, also of cost, different surface-filter structures have become known for different intended uses, namely, inter alia, paper, fabric, mineral, metal and also plastic filters.

A fundamental problem where paper filters and sensitive fabric filters are concerned is that there must be no mechanical contact between a cleaning-off nozzle and the filter surface, because otherwise destruction would occur. Consequently, with such filters, the nozzles have to move at a distance from the filter surface. A one hundred per cent cleaning of the filter surface, as required by a color change, therefore cannot be achieved during the passage of a nozzle over it. In addition, as a rule, the mechanical supporting structure for the filter impedes the nozzle cleaning. As a result, whenever a color change, which, as indicated, can become necessary relatively often, is required in the booth, such filters also have to be exchanged. In contrast, with normal fabric filters, contact between the nozzle surface and filter surface is possible, and this, although resulting in higher efficiencies, nevertheless also leads to easier contamination of the filter as result of mechanical clogging/choking. Furthermore, mechanical abrasion causes the formation of fluff, which has to be removed from the cleaned powder material, to be reused if possible, by means of an additional operation.

In order to overcome the disadvantages of these known paper and fabric filters, particularly the need for a filter exchange at each color change, plastic filters are being used to an increasing extent. However, these can be employed, in conjunction with the nozzle systems described, only for a limited time, because, on the one hand, a nozzle guided at a distance from the filter surface does not ensure the necessary sufficient cleaning, whilst a nozzle sliding on the filter surface leads in time to the clogging and especially wear of the plastic surface. These difficulties arise to an increased degree when, for static reasons, plastic filters are designed with a surface grooved on the booth side in order to increase their strength.

Such plastic filters are generally mounted as filter packages and cleaned by means of pressure pulses. Adjacent filter parts are thereby subjected to cleaned-off powder material, and therefore controlled cleaning, such as would be necessary for a color change, is impossible.

SUMMARY OF THE INVENTION

The object on which the invention is based is, therefore, in order to increase the efficiency of a booth of the type described in the introduction, to provide a surface-filter cleaning system which can be used universally for various types of surface filters and which ensures a sufficiently high degree of cleaning with the aim of avoiding a filter exchange in the event of a color change.

This object is achieved, according to the invention, in that the rear side of the surface filter is divided into a plurality of cell-like portions which are sealed off from one another and which are assigned at least one compressed-air nozzle directed towards the filter rear side and supplying pressure in each case to at least one of the portions, and in that this compressed-air nozzle is arranged movably over the field of the portions. It is especially preferred, at the same time, that the portions be arranged according to a predetermined pattern.

By means of the solution according to the invention, it is possible to clean filters in an essentially sheet-like arrangement irrespective of the nature of their surface, that is to say irrespective of whether this is of a specially sensitive material, whether it is plane or corrugated, whether it has a corrugated, saw-tooth-like or otherwise alternating design to increase the effective filter surface, etc. Thus, to be precise, the arrangement of the rear side of the cleaning system in a cell-like design allows a compensation of irregularities or other geometrical deviations from the plane, be these for reasons of construction or material, with regard to a movement of the cleaning system in relation to the filter surface, in that the space behind the filter is divided into a relatively large number of suction cells, so that a "static plane" for the movement of the cleaning system is obtained. Depending on the set object or the desired cleaning effect, relatively small parts of the filter surface can be subjected to pressure in a controlled manner, and in addition a mechanical support of the filter surface can be achieved as a result of the division, by means of frame-shaped walls which can surround the respective individual cells. It is especially advantageous that the cleaning of the filter can be carried out continuously during the coating operation, so that optimum effectiveness can constantly be achieved for the filter. The preferred arrangement of the portions according to a predetermined pattern affords the possibility of a program control, and during the coating operation, the cleaning nozzle can be moved continuously in steps from one of the cells to be subjected to compressed air to the next. During continuous running, the size and arrangement of the orifices for the nozzle or nozzles, which at the same time form the suction orifices for the filter, determine the duration/length of the cleaning pulse of the nozzles.

The invention can be put into practice in an especially expedient way in terms of construction if the nozzle is assigned a sealing covering device movable with it, for sealing off the respective portion subjected to pressure by the nozzle in relation to the remaining portions. This ensures that the cleaning device for the surface filter automatically always covers only one of the cell-like portions, and that the booth as a whole can continue to work during the cleaning time of this portion.

In an especially preferred design of the invention, the cell-like portions are intended to form a plane surface with the edges of their orifices for the compressed-air nozzle, that is to say particularly for the covering device moved with this, so that, in the abovementioned preferably automatically controlled movement cycle, the nozzle can sweep across the rear side of the filter irrespective of whether the filter surface is completely plane or is designed with any corrugations, arches, an alternating profile or similar forms serving for enlarging and/or otherwise improving the functioning of the filter and deviating from the plane. In other words, the depths of the individual cells can vary relative to one another, and the arrangement of the orifice plane provides a compensation of any unevennesses of the filter surface in relation to the movement of the cleaning nozzle.

With surface filters usually arranged vertically in coating booths, it is especially beneficial if the cell-like portions are arranged in vertical or horizontal rows or lines, in which case, depending on the height of the surface filter and the prevailing pressure conditions, the entire height of the filter can be subjected to pressure by one nozzle or at least there can be a subdivision into a plurality of parts which the nozzle then passes over successively in the vertical direction, until it subsequently moves further to the adjacent vertical row.

The invention can however be put into practice not only in conjunction with vertical surface filters, but also of those in any other position, for example horizontally arranged fixed floor surface filters. A special advantage is afforded when the booth has a floor filter which can be designed inclined at least partially relative to the horizontal. Cleaned-off powder can thus be transported by the utilization of gravity to a respectively lower point, at which a groove or a channel can receive the powder in order to convey it out of the booth. For example, the floor filter can be designed here with filter sections inclined outwards in a roof-shaped manner from a mid-axis and on which, during cleaning, excess powder can easily slide outwards under the effect of gravity and be received in concentrated form in the edge region and removed. It is especially expedient, at the same time, if the booth is equipped with a secondary suction-channel arrangement which, according to a preferred embodiment, comprises in each case a secondary suction channel in the transitional region between the booth floor and the two vertical booth walls. Thus, powder material blown off or transported away outwardly from the floor filter inclined in a roof-shaped manner, together with powder falling from the vertical filters, can be collected in a concentrated form, directly and independently of the remaining suction system of the booth, in a lateral collecting region causing little disturbance to the functioning. On the other hand, however, it is also possible, without such a secondary suction system, to design in the at least partially inclined floor filter at least one powder-collecting channel which, depending on the type of construction of the booth or on other practicalities as regards the powder discharge, can be arranged in the edge regions in relation to the side walls or in the middle region of the floor filter. The floor filter will then be shaped with corresponding regions inclined toward such channels, whilst the discharge in the channel or channels can take place by means of a channel-type fluid floor inclined in the conveying direction or by means of mechanical transport elements. In other words, it is thus possible to feed powder material falling from the filters or cleaned off by separate devices suitable for this purpose directly away and to a collecting device, for example in the form of an external powder container, without the danger of powder accumulations/deposits in the booth interior. A further considerable advantage of such a secondary suction system or channel-type conveyor system is that only one central powder container is required for all the filter units. A single powder container is therefore sufficient even for a series arrangement of a plurality of booth units.

According to another development of the invention, the vertical surface filter or filters can be designed as filters arranged in a U-shaped manner, with an essentially plane main surface and with two auxiliary surfaces extending at an angle from its edges into the booth space, although other geometrical forms for the arrangement of the filter planes also come into consideration here, for example a V-form or curved arrangement. A decisive advantage of the cleaning system according to the invention becomes clear from these examples: it thus becomes possible, to be precise, by means of the cells on the rear side, to make filter surfaces arranged at an angle to one another, that is to say not extending in a common plane, functionally plane in terms of the plane of movement of the cleaning tool, so that the cleaning tool has to execute only a rectilinear movement and not any curved or other movement, whilst at the same time the size of the filter surface as a whole can nevertheless be increased considerably. Appropriately, for such U-shaped filters, there will be arranged, for example in relation to a plane of symmetry, two nozzles, specifically one on each side, for which a common drive can be provided. It becomes possible, at the same time, to mount under the U-filter a powder container into which the blown-off powder can fall directly.

As already indicated, the rear-side nozzle cleaning system makes it possible substantially to enlarge the effective filter surface by various measures in the geometrical design, without the possibility that cleaning problems will occur. Thus, the surface filter can be designed with a corrugated, alternately U-shaped or V-shaped or similarly formed surface; of course, other geometrical surface forms, not to be listed in detail, which contribute to enlarging the filter surface effectively also come into consideration here.

To prevent the functioning of adjacent portions being impaired in any way by the cleaning of a cell portion, for example in that, particularly where a vertical cell orientation is concerned, powder blown off by the pressure nozzle is sucked up by an adjacent portion just cleaned, which is already performing its normal work function again, the covering assigned to the nozzle can also cover one or more cell portions.

Whilst, as described, the cleaning of the surface filters by the rear-side nozzle arrangement according to the invention can take place continuously during the operation of the booth, it is also possible, of course, to work with this system during the cleaning of the booth walls in the event of a color change, etc. Thus, the booth can be equipped, in addition to the system according to the invention, with a cleaning device movable through the booth interior and having mechanical cleaning, especially scraping elements, scraping lips, brushes or the like for the mechanical stripping off of powder adhering to the booth walls. These elements expediently have some elasticity and ensure that powder adhering to the booth wall, as it does to the filter, is stripped off mechanically and can then be transported out of the booth in the air stream via a suction system, so that it is no longer necessary to clean the booth by means of all possible manual aids. It is highly expedient to equip such a cleaning device with a suction system integrated in it. If, especially in such an arrangement, the cleaning device and compressed-air nozzle are arranged so as to be movable synchronously with one another over the Q- filter surfaces to be cleaned, the cleaned-off powder can be concentrated into a common powder container, that is to say recovered, if appropriate by way of an additional secondary suction-channel system.

Altogether, the invention provides a cleaning system by means of which a continuous and thorough cleaning of the filters during operation and/or in the event of a color change is possible, and in which the filters are to be arranged so as to be quickly and easily exchangeable in relation to the call system. Of course, the use of the cleaning system according to the invention for regeneration of the filters and complete cleaning with the effect of avoiding a filter exchange in the event of a color change also depends on the filter material employed and on economic aspects. Thus, if there is a small number of color shades, the filter change can be more economical and, for example, a needle-felt filter, which could not be cleaned sufficiently completely with compressed air alone if there were widely varying color shades, can be used.

BRIEF DESCRIPTION OF THE DRAWINGS

Further advantages and embodiments or possible versions of the invention emerge from the following description of the exemplary embodiments represented in the diagrammatic drawing. In this:

FIG. 1 shows a top view of a powder-coating booth intended for intermittent operation, the booth ceiling being omitted, with a compressed-air nozzle arrangement according to the invention for a U-shaped surface filter with horizontally extending pressure application portions for the nozzle, FIG. 2 shows a cross section through the booth taken along section line II—II of FIG. 1, FIG. 3 shows a section III—III of FIG. 1, FIG. 4 shows a section IV—IV of FIG. 3 on an enlarged scale as a detail of the compressed-air nozzle arrangement with a plane filter, FIG. 5 shows a cross section similar to that of FIG. 4, but for an alternative version of the nozzle design and a surface filter with an alternately V-shaped enlarged filter surface, FIG. 6 shows a modified embodiment of the invention for a continuous-flow booth (with continuous operation) which has a plane surface filter with vertical pressure application portions, a floor filter and a secondary channel suction, FIG. 7 shows a detail section according to VII—VII of FIG. 6 on an enlarged scale and additionally in conjunction with a booth-cleaning device (not shown in FIG. 6) movable through the booth interior, FIG. 8 shows a sectional side view of a booth with a further version of the cell arrangement, and FIG. 9 shows a version of the embodiment illustrated in FIG. 6, with a central powder channel.

DETAILED DESCRIPTION OF THE PREFERRED EMBODIMENTS

A powder-coating booth 1 illustrated in FIGS. 1 to 3 defines a booth interior 10 which is sealingly enclosed by a wall 11 with a booth ceiling 16, each made of stable wall material, inter alia plastic, sheet metal, preferably special sheet steel, or the like. The booth 1, here designed as a hand-operated coating booth, that is to say as a booth with an intermittent workpiece movement, rests on a stable supporting stand 12, provided underneath a booth floor 14 and has a front orifice 13, from which articles introduced into the booth interior are coated by means of conventional spray guns which, for the sake of clarity, are no more shown here than the articles to be coated themselves. On the rear side of the booth 1 is located a filter-housing portion with an arrangement of filters 2 which are provided here as surface filters 22 with a secondary filter device comprising a plurality of cartridge filters 21. In order to convey excess coating material, that is to say which in not settled on the surface of the workpiece to be coated, up to the surface filter 22, the filter arrangement 2 is connected to a suction 5 which comprises a suction fan 50 with a channel system 501 assigned to the cartridge filters 21. The sucked-off air cleaned of excess powder in or on the filters 22 or 21 can be discharged into the ambient air. For powder separated at the filters there is a powder receptacle 6 which includes a powder-collecting container 62 serving for recovering powder accumulating on the surface filter 22 by returning it to the powder feed, with a screening machine and injector, these not being shown in any more detail, for conveying the powder to the spray gun, and a powder-collecting trough 61 underneath the secondary-cleaning cartridge filters 21. This collecting trough 61 can form a waste container.

The guiding idea of the invention is the design of a cleaning device 7 which is arranged on the rear side of the surface filter 22 indicated by the arrow R and which essentially comprises a pressure-nozzle system, here comprising two pressure nozzles 71, together with a cell arrangement of pressure application portions 72 composed according to a uniform pattern. The individual portions 72, which for their part are closed relative to the outside and, in this exemplary embodiment, are arranged horizontally, have orifices 721 for the nozzles 71 and are sealed off from one another by means of portion walls 722. Outside the orifices 721, these portions are likewise provided with a sealing wall. The two pressure nozzles 71 are jointly movable vertically, so that they apply pressure to individual portions 72 successively in steps and can thus clean the surface filter 22 oppositely to the conventional filter direction into the booth space. The portions 72 not subjected to pressure by the nozzles 71 work normally, that is to say they are under the vacuum generated by the suction fan 50. By means of this vacuum, the air is sucked through the filter 22 for secondary cleaning to the cartridge filters 21, from which residual powder passes to the powder receptacle 6 and the clean spent air into the environment.

As can be seen especially from FIG. 1 in conjunction with FIG. 2, the surface filter is made U-shaped, auxiliary surfaces 223 extending from a main surface 221 or its edges 222 into the booth space 10. The effective surface of the filter 22 is decisively enlarged as result of these auxiliary surfaces 223. In order, in respect of the compressed air blown through the nozzles 71 onto the rear side of the filter 22, to generate flow and therefore pressure conditions as uniform as possible over the entire rear side of the filter, the cells are designed with a streamlined cross section which, as illustrated, tapers as its distance from the nozzle increases, so that a uniform flow speed occurs at the filter.

As can be seen from this example, therefore, with the cleaning tool according to the invention not only is a continuously uniform cleaning of a surface filter during the powder-coating operation possible and therefore an increase in the filter efficiency achievable, but at the same time an enlargement of the filter surface is obtained, whilst at the same time ensuring a constructionally simple possibility of cleaning angled filter-enlarging surfaces. In other words, as regards the movement of the cleaning nozzles 71, the angled filter parts are designed as "plane" in relation to the cleaning function as a result of the chamber design shown, and the cleaning tool does not have to execute any curved or other angular movement, but can be moved in an absolutely rectilinear manner.

A further advantage of such an embodiment is that the powder container 62 can be arranged directly underneath the surface filter 22, so that the powder forced back into the booth space 10 during cleaning can fall directly into the powder container 62. As shown, this is made appropriately conical, so that a collection at its lowest point with a corresponding draw-off possibility and a direct feed to the spray gun can be implemented in a constructionally simple way.

FIG. 4 shows in detail the functioning of the pressure nozzle 71 which is designed with a covering 73 around its nozzle orifice and which is moved over the rear side of the portions 72. The portions 72 are provided with orifices 721 and are sealed off from one another by means of the portion walls 722, so that they form essentially closed cells which are open towards the nozzle and the front side of which is covered by the surface filter 22. By means of the covering 73 surrounding the nozzle orifice, in each case at least one of the portions 72 is completely sealed off when being subjected to pressure by the pressure nozzle 71, so that the vacuum generated by the suction fan 50 does not take effect here, but air is blown towards the filter 22 and the latter is cleared of powder adhering to or in it into the booth space.

The necessary firm bearing of the pressure nozzles 71 against the surface formed by the portion walls 721 with the orifices is obtained by means of springs 711.

As can be seen, the walls 722 form a stable frame system or framework and thus contribute decisively to supporting the filter.

FIG. 5 shows an embodiment of the nozzle system modified in two ways relative to that of FIG. 4, specifically 72 with a nozzle 71 which is suitable for low cleaning pressures and which is surrounded by a covering 73 of a substantially larger surface in such a way that in each case at least one portion, or its orifice 721, located on the two sides of the portion about to be subjected to pressure is also covered. In this way, therefore, the two (or more, depending on the size of the covering 73) portions adjacent to the portion about to be cleaned are deprived of the effect of the suction fan and are virtually pressureless in relation to this. This ensures that powder cleaned off into the booth space under relatively low pressure can not be sucked up again immediately in the adjacent portion and thereby at least partially nullify the cleaning operation which has just taken place. Whereas, with a horizontal arrangement of the portions 72, this problem is not of decisive importance, since the pressure nozzles 71 are moved from the top downwards and therefore the powder will in any case fall down under the effect of gravity, at all times then passing into the region of the next portions to be cleaned. This arrangement is shown in FIG. 5, wherein a wide covering for vertically arranged cell portions is provided Furthermore, FIG. 5 shows that the cleaning tool according to the invention affords the possibility of decisively enlarging the filter surface by means of alternately V-shaped, U-shaped, sinusoidal or the like arrangements, without impairing the cleaning possibilities. On the contrary, there is a uniform cleaning of such a filter, the effectiveness of which filter is decisively improved and which, moreover, is substantially supported by the rear-side framework of the walls 722, as already indicated, so that virtually all filter materials suitable for the particular purpose can be employed, irrespective of their inherent rigidity.

FIG. 6 shows an alternative design of a continuous-flow booth with a lateral surface filter 22 and with a floor filter 24 which is made roof-shaped with inclined filter sections 241. The two filters 22 and 24 are each assigned a pressure nozzle 71 with a corresponding suction-portion arrangement 72, these portions 72 being arranged vertically in the region of the surface filter 22 and, in the region of the floor filter, being perpendicular to the booth run-through direction (perpendicular to the sheet plane). Along the lower edge of the surface filter 22 and of each of the two longitudinal edges of the filter sections 241 extends in each case a secondary suction channel 531 of a secondary suction-channel system 53. With this suction version, on the one hand, material which is not received on the workpiece to be coated and which also does not pass to the filters 22, 24 can be suctioned off directly, and at the same time the secondary channel system receives material which is cleaned off from the filters by the pressure nozzles 71. In other words, this secondary suction-channel system can receive material to be removed, both during the main operation of the booth 1, that is to say during coating, and during cleaning by means of a cleaning device 4 yet to be described further below. For this purpose, the secondary suction-channel system 53 is connected to a vacuum-generator unit located outside the booth, for example a cyclone. The total flow of spent air is therefore divided into two air streams, one air stream being guided, during coating, out of the booths through the filter elements 22 and/or 24, whilst the other air stream, during coating, transports, via the secondary suction channels 531, powder wandering about especially in the lower corner regions or, during cleaning, the powder separated by the filters and to be removed, to a powder container, not shown here, arranged outside the booth. There, an additional filter surface is provided for the separation of powder and air to be discharged into the environment. The advantage of such a suction-flow division is that, as already mentioned, surface filters, in order to achieve a sufficient cleaning capacity, have to be made very large, but as a rule the booth wall cannot be appreciably enlarged with a view to the filter size then necessary. As a result of the possibility of arranging one or more external filters, the separating capacity of surface filters, lower than that of cartridge filters in relation to size, can thus be compensated in a simple way. A further advantage is to be seen in that, where appropriate, only a single central powder container is needed for all the filter units, that is to say one central powder container is sufficient even for a series arrangement of a plurality of booth units, and the currently customary known transport alternatives, such as a vibrating floor in the booth, fluid floor, transport by means of injectors, etc., consequently become superfluous.

FIG. 7 shows a further possible variation. In this embodiment, the rear-side nozzle cleaning is combined with a cleaning device 4 which is movable through the booth space 10 and which is intended to ensure that the booth walls, including the surface filters, are cleaned off. This cleaning device 4 is merely indicated here and comprises a carrier 41 which in form is matched essentially to the cross section of the booth, as can be seen from FIG. 6, and which leaves a working gap 43 in relation to the booth walls. Arranged in this, fastened rotationally to the carrier 41 in the form of two crowns, set obliquely relative to the direction of movement B and overlapping one another in terms of their effect in the direction of movement B, are elastic cleaning elements 42 with scraping lips 421 which mechanically strip off powder material adhering to the booth wall.

Stripped-off or otherwise cleaned-off powder material is transported away either through the channels 53, 531 since such a secondary suction can also be arranged within the cleaning device 4, a suction channel 451 is arranged between the crowns of the cleaning elements 42. A changeover is expediently provided between the two secondary suction possibilities. The arrangement, as shown in FIG. 7, is especially beneficial for the cleaning of surface filters, particularly when the filter surface is profiled or corrugated for example in the manner of FIG. 5. The cleaning device 4 and pressure nozzle 71 move sunchronously with one another, so that, with the cleaning device being designed as a suction wall 45 with integrated secondary suction, as indicated by the suction channel 451, material blown out of the filter by the pressure nozzle can be caught directly by the suction and transported away.

FIG. 8 illustrates a booth installation in which the flat-filter cleaning device 7 is designed with cell portions 72 arranged at an oblique angle relative to the horizontal. In this version of the portion arrangement, it is possible in an especially simple way that the pressure nozzle 71 can reach easily into the uppermost and lower most regions and take effect there.

As can be seen from the embodiment of the booth, if appropriate with cleaning device 4, in FIG. 6, this is equipped, when used as a continuous-flow booth, with a passage 40 for unimpeded workpiece transport, for example by means of circular conveyors 401 (merely indicated).

In the alternative version shown in FIG. 9, in contrast to that of FIG. 6 there is provided, instead of a secondary channel suction, a floor filter 24' which is inclined from the lateral surface filters 22 inwards to a powder-collecting channel 56. In this case, the pressure nozzles 71 can be arranged in an especially advantageous way in the lower corner regions, and consequently two such nozzles are sufficient. The middle nozzle shown in FIG. 6 can be omitted, for the outer two also apply pressure to the respective part regions 241' of the floor filter 24' and cause the powder located on these to be transported to the powder-collecting channel 56. The latter can, once again, be provided with an inclination in the desired transport direction, in conjunction with a fluidising device or with a mechanical discharge element (scraping, rubbing or stripping conveyor, doctor), in order to convey the powder out of the booth. Preferably, the discharge element can be driven jointly with the pressure nozzles 71, and the movement connection can, inter alia, be made magnetically, so that the driving elements as a whole can be placed outside the booth interior and do not have to be taken into account during the cleaning of the booth.

It should be pointed out, moreover, that, of course, the most diverse combinations between filter devices and other elements conventional in spray-coating booths of this type, for example also with regard to the powder recovery (collection of separated powder), are possible, and that the primary aim is to provide an effective cleaning device for flat filters used, in order to ensure not only the regeneration but also the continuous cleaning of these during operation and during the overall cleaning of the booth.

It should also be pointed out that, advantageously, at least part of the walls 722 separating the cell-like portions 72 from one another can be produced from filter material, with the result that both the generation of cleaning shadows in the filter-side corner regions of the recesses improvements in the cell design/cell production can be obtained [sic].

It can be advantageous, furthermore, to design the cleaning device 4 with at least two mutually spaced crowns of the cleaning elements 42, the spacing of these crowns corresponding at least to the width of the cells or pressure application portions 72. This, during the final cleaning of the booth, reliably prevents the possibility that powder will settle on adjacent filter-surface regions outside the cleaning device. The cleaning elements 42, if they are preferably designed as scraping lips, as explained above, can also be arranged at right angles to the direction of movement B as a rotationally continuous crown, that is to say have no oblique position. A complete mechanical sealing off of each of the cell-shaped portions 72 thereby occurs at the moment of final cleaning, so that no material remains in the booth.

I claim:

1. A booth for the spray coating of articles with a coating material comprising:

a plurality of walls defining a work space within which articles are coated with the powdery coating material;

a stationary filter for at least one of said walls;

means for exhausting powder laden air from the work space through said filter, said filter having a surface exposed on a front side to the work space for collecting powder as air is drawn through the filter and a plurality of cells open to a rear side of the filter each having cell walls extending from the front side to the rear side of the filter for separating the cells;

means for cleaning the filter with compressed air including a nozzle and means for moving the nozzle, the nozzle being arranged adjacent the rear side of the filter;

means for supplying compressed air to the nozzle;

a covering device adjacent an end of the nozzle, said nozzle supplying compressed air to the rear side of the filter from the compressed air supply means, said covering device engaging a rear surface of the filter defined by end portions of the cell walls for sealing an area of predetermined ones of the cells surrounding at least one of the cells being cleaned; and said nozzle supplying compressed air during cleaning through the at least one cell in a direction opposite to the flow of air exhausted by said exhaust means to dislodge powder material from the front surface of the filter, wherein the covering device prevents the dislodged powder from being drawn back into engagement with the front surface of the filter by said exhausting means in the area of the filter covered by the covering device.

2. A booth according to claim 1, further comprising a suction device and means for moving said suction device, said suction device being positioned adjacent to said front side of the filter opposite said cleaning means for receiving powder dislodged from the front surface of the filter by said nozzle, and said suction device including vacuum means for providing a vacuum to the suction device that draws air and dislodged powder into the suction device, and said suctioning device including at least one cleaning element for engaging the front surface of the filter to loosen powdered coating material during movement of the suctioning device by said suctioning device moving means.

3. A booth according to claim 1, wherein said cells are arranged in a predetermined pattern.

4. A booth according to claim 1, further including said rear surface being a planar surface that engages said nozzle during cleaning.

5. A booth according to claim 1, wherein the cells are arranged in one of vertical and horizontal and in one of rows and lines.

6. A booth according to claim 1, further including a floor filter having an inner surface facing the interior of the booth that is inclined at least partially relative to horizontal.

7. A booth according to claim 6, wherein said floor filter has filter sections inclined outwardly in a roof shape from a mid portion thereof.

8. A booth according to claim 1, further comprising a channel arrangement arranged adjacent a lower end portion of the filter for collecting powdery material dislodged from the front surface of the filter by said cleaning device.

9. A booth according to claim 8, further comprising said booth having a booth floor and vertical booth walls, wherein said filter is mounted in the at least one of the booth walls and said channel arrangement is located in a transition region between the booth floor and the booth walls.

10. A booth according to claim 9, further comprising at least one powder collecting channel formed in the floor.

11. A booth according to claim 1, wherein the filter has a U-shape with a planar main surface and two auxiliary surfaces extending at an angle from their edges into the interior of the booth.

12. A booth according to claim 1, wherein the surface of the filter has one of a corrugated, alternately U-shaped and V-shaped design.

13. A booth according to claim 1, further comprising an interior cleaning element movable with said cleaning means in the interior of the booth and having means for mechanically stripping powdery material adhering to the front surface of the filter.

14. A booth according to claim 13, further comprising a suction channel connected to a vacuum source for drawing powder dislodged from the front surface of the filter by said mechanical stripping means.

15. A booth according to claim 13, wherein said moving means moves said cleaning means and said cleaning element in synchronization for cleaning the entirety of the filter.

16. A booth according to claim 13, wherein said cleaning element includes two mutually spaced crowns spaced apart by a dimension equivalent to a width of one of the portions.

17. A booth according to claim 1, wherein said cell walls are made of a non-air-permeable filter material.

* * * * *